UNITED STATES PATENT OFFICE.

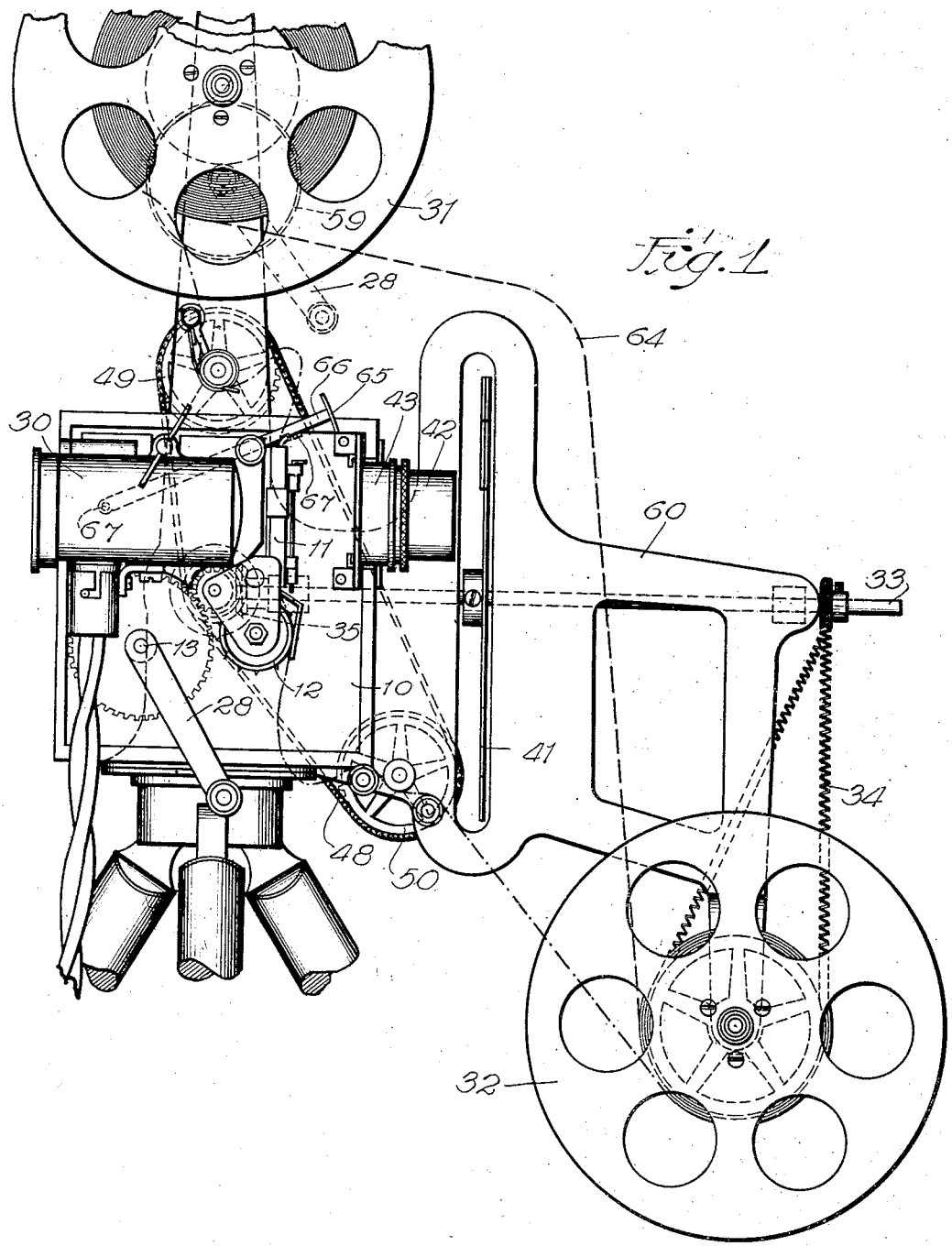

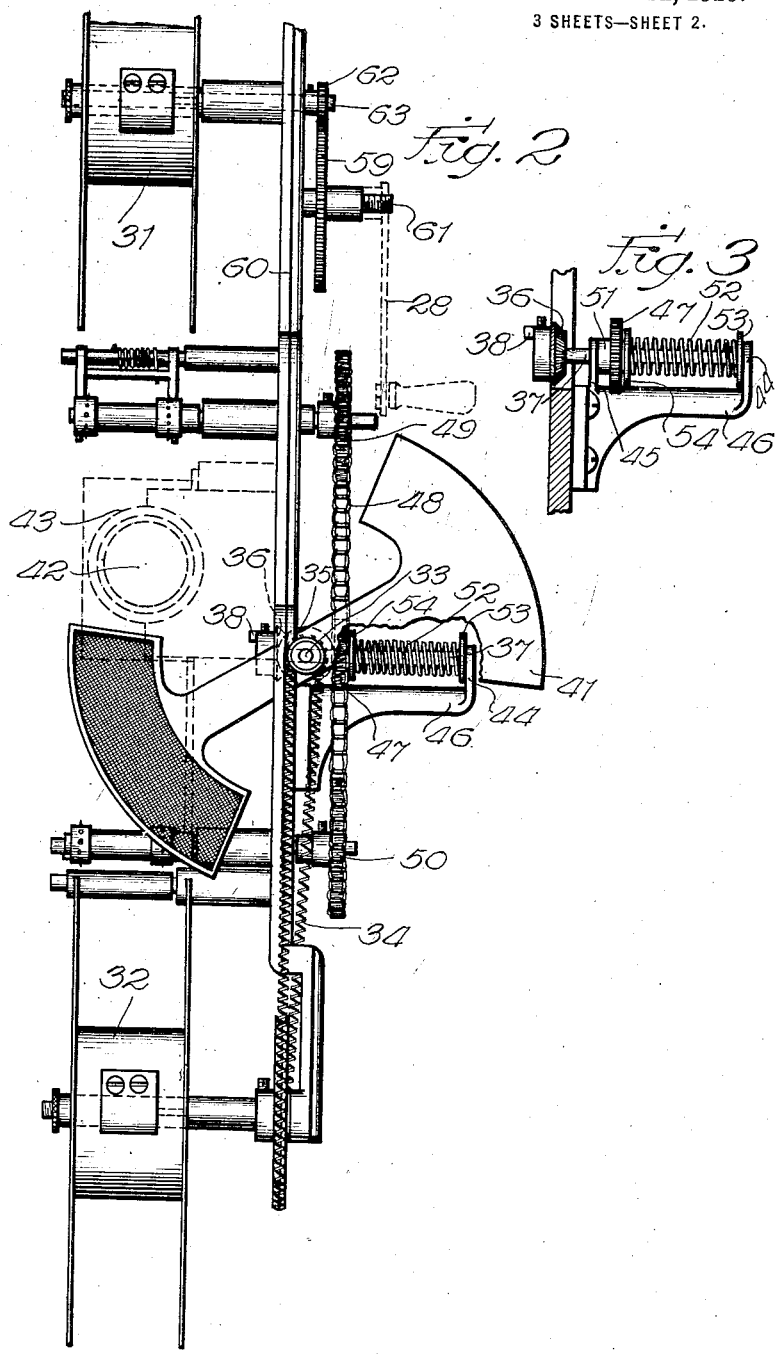

VARIAN M. HARRIS, OF CHICAGO, ILLINOIS, ASSIGNOR TO KLIX MANUFACTURING COMPANY, OF CHICAGO, ILLINOIS, A CORPORATION OF ILLINOIS.

FILM HOLDING AND ADVANCING MEANS.

1,318,868.      Specification of Letters Patent.      Patented Oct. 14, 1919.

Original application filed March 1, 1918, Serial No. 219,797. Divided and this application filed June 24, 1918. Serial No. 241,701.

*To all whom it may concern:*

Be it known that I, VARIAN M. HARRIS, a citizen of the United States, residing at Chicago, in the county of Cook and State of Illinois, have invented a certain new and useful Improvement in Film Holding and Advancing Means, of which the following is a full, clear, concise, and exact description, reference being had to the accompanying drawings, forming a part of this specification.

This invention relates to combined motion picture camera and projector, and is especially concerned with improvements in the mechanism illustrated and described in my co-pending application Serial No. 195,040, filed October 6, 1917.

The objects of my present invention are:

1st. To simplify and improve in general the construction of the machine disclosed in my co-pending application above referred to; and 2nd. To provide a novel magazine for holding the unexposed film and for receiving the film after it has been exposed, this magazine being of such construction as to permit daylight loading of the camera.

Other objects will definitely appear as the description progresses, reference being had to the accompanying drawings, in which Figure 1 is a side elevation showing my improved motion picture camera in combination with means for converting it into a projector. In this view the path of the film during the projecting operation is shown by means of a dot and dash line and the path of the film during the rewinding operation is shown by means of a dash line;

Fig. 2 is a front elevation of the mechanism illustrated in Fig. 1, the camera being shown in dotted outline and certain portions of the apparatus being broken away for the purpose of better illustration;

Fig. 3 is a detail view showing the means by which I secure a more uniform and constant motion of the moving parts of the projector during the projecting operation;

Similar characters of reference refer to similar parts throughout the several views.

In the accompanying drawings I have illustrated only those portions of the structure illustrated and described in the application above referred to which are necessary to give a clear understanding of the relation between my improvements and the parts with which they coöperate in the prior structure.

Figure 4:
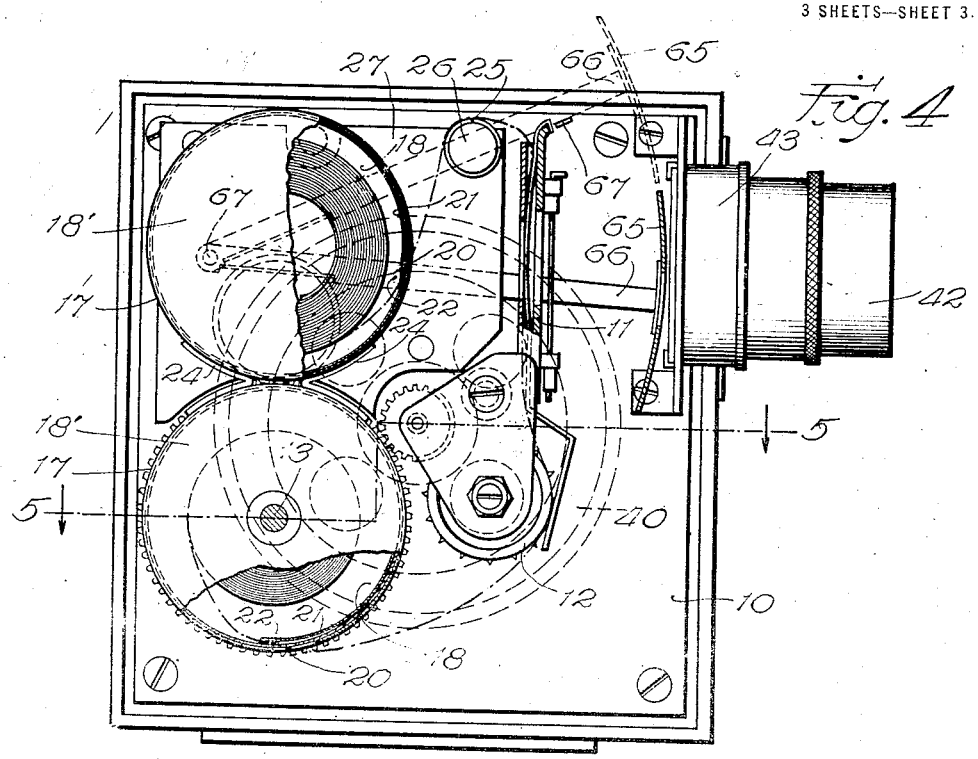
Fig. 4 is a side elevation of my improved camera with the cover removed showing my novel supply and take-up magazine in side elevation, portions of the closures of these magazines being broken away to better disclose the interior construction and the arrangement of the film in the magazines.
Figure 5:
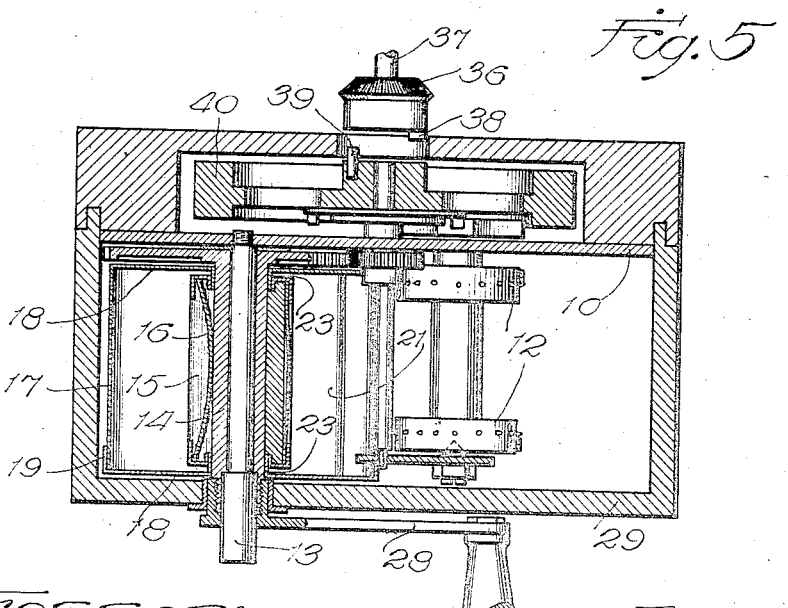
Fig. 5 is a transverse horizontal section taken on the broken line 5—5 of Fig. 4.

Referring first to Figs. 4 and 5, the reference character 10 indicates the frame plate upon which is mounted a film chute designated as a whole by the reference character 11. Rotatably mounted at the lower end of the film chute 11 are the sprocket wheels 12—12 which are driven through suitable mechanism, described in my application above referred to, from the drive shaft 13 to intermittently advance the film through the film chute 11. As the means for securing this intermittent motion form no part of my present invention they will not be described in detail. Rotatably mounted upon the post 13 is a drive shaft or sleeve 14. Rotatably mounted upon the sleeve 14 is a film spool 15 having a bowed spring 16 which engages with the outer surface of the sleeve 14 to provide a frictional drive between the sleeve 14 and the film spool 15, (for the purpose described in the application above referred to.) This spool is provided with suitable means for receiving the end of the film.

My improved supply and take-up magazines comprise a pair of cup shaped receptacles 17 provided with a pair of end closures 18 and 18', the closures 18 being formed integral with the side walls of the receptacle. The closures 18' are provided with flanges 19 which engage the sides of the receptacles and are detachably secured thereto by means of a pin and bayonet slot connection. This connection is not illustrated in detail as it is well known and for the further reason that I may employ any other means for detachably securing the closures 18' to the receptacles. Each of the receptacles is provided with a film slot 20 in the side thereof through which the film passes. These slots are provided with light traps in the form of resilient tongues 21 which are secured to the inner side of the receptacles at one end and provided with a layer of cloth 22, or other suitable material, at the other end for sealing the slots against the entrance of light when the film is completely drawn into the magazines.

The upper receptacle shown in Fig. 4 constitutes the supply receptacle in which a roll of film is loosely placed without any support whatever, the roll of film merely lying loosely within the receptacle. The lower receptacle forms the take-up magazine and, as described above, is provided with a film spool having a frictional drive for taking up the film advanced through the film chute by the sprockets 12. Since the magazine 17 is supported by means of the sleeve 14 both end closures thereof are provided with central apertures and have inwardly extending flanges 23 which surround the central apertures and snugly engage the sleeve 14. These flanges are received in the ends of the film spool 15 to provide means for rendering the magazine light proof at the two points where the sleeve 14 passes through the end closures.

The take-up magazine is free to oscillate about the sleeve 14 and the supply magazine is secured to the upper side of the take-up magazine by means of the V shaped strips 24, the ends of which are soldered or otherwise secured to the sides of the magazines. As a result of this construction the supply magazine oscillates with the take-up magazine about the shaft 13 as an axis. The sleeve 14, therefore, acts as a support for both the supply and take-up magazines.

It will be noted from an inspection of Fig. 4 that the film slot in the supply magazine is adjacent to the film chute and that the film leaves the supply magazine in a substantially tangential direction and passes about a roller 25 which is rotatably mounted upon a pin having an outer head 26, the inner end of said pin being riveted to the cover plate 27 which is supported in spaced relation to the frame plate 10, as described in my application above referred to. The film passes from the roller 25 into the film chute 11 in substantially the manner illustrated in Fig. 4.

By thus arranging the supply magazine to oscillate about the sleeve 14 between which and the take-up magazine there is a slight frictional drag, due to the engagement of the flanges 23 with the ends of the film spool 15, and to the further fact that during the operation of the camera the crank 28 is rotated in a clockwise direction, the supply magazine tends to rotate in a clockwise direction about the sleeve 14 and thereby places a slight amount of tension upon the film which causes the film to advance through the film chute without jerking. Furthermore, by mounting both the supply and take-up magazines upon the sleeve 14 I provide a simplified and more compact structure and from which it is comparatively easy to remove the magazines by simply removing the crank 28 and the cover 29, and then pulling the magazines outwardly.

In Fig. 1 I have illustrated my camera in connection with the mechanism for converting it into a projector, the magazines having been removed and an illuminating unit 30 having been substituted therefor, as described in the application above referred to. The reference characters 31 and 32 indicate the supply and take-up reels respectively. The take-up reel 32 is driven from the shutter shaft 33 through the spring belt 34. The inner end of the shutter shaft 33 is provided with a bevel gear 35 which meshes with a bevel gear 36. The bevel gear 36 is secured to the driven shaft 37 and is provided with a pin 38 which forms a detachable driving connection with a pin 39 (see Fig. 5) in which the pin 39 is shown separated from the pin 38 secured to the flywheel 40. By means of the mechanism just described, which is described more in detail in my prior application, the motion of the flywheel 40, which is driven through intermediate gearing from the sleeve 14, is transmitted to the take-up reel 32. The projecting shutter 41 is secured to the shaft 33 intermediate the bevel gear 35 and the forward end of the shaft 33 so as to rotate directly in front of the projecting lens 42, which is supported by a suitable lens support 43.

It has been found in practice that the moving parts of my camera operate so freely that it is somewhat difficult to operate the projecting apparatus at a uniform or constant speed, the moving parts responding promptly to any slight increase or decrease in the force exerted upon the crank 28. As it is desirable in projecting the pictures to advance the film at a constant rate I have provided means for placing a constant drag upon the moving parts to thereby prevent any fluctuation in the speed due to any slight increase or decrease in the force exerted upon the crank 28. This means is illustrated in Fig. 3 in which the driven shaft 37 is shown as being rotatably mounted in a pair of bearings 44 and 45 respectively which are carried by a bracket 46. Secured to the shaft 37 is a pinion 47 which meshes with the sprocket chain 48 to drive the film sprockets 49 and 50 described in my prior application. The shaft 37 has slight longitudinal movement in the bearings 44 and 45 and is provided with a hub or collar 51 which is forced into frictional contact with the outer side or end of the bearing 45 by means of a spring 52 which surrounds the shaft 37 and has its one end confined by a washer 53 which is limited in its outward movement by the bearing 44, and the other end of which bears against a washer 54 which in turn engages the outer end of the hub of the pinion 47. From the above description it will be clear that as the shaft 37 rotates the collar 51 is held in frictional contact with the outer end of the bearing 45 and thereby places a drag upon the motion of the shaft 37. This frictional drag tends to equalize any slight inequality in the force applied to the crank 28 and to thereby cause a constant or uniform speed of the moving parts.

In using my projecting apparatus after a film has once been transferred from the supply reel to the take-up reel it is necessary to rewind the film in the opposite direction before it can again be transferred from the supply reel to the take-up reel. In order to expedite the rewinding of the film upon the supply reel I have provided a spur gear 59 which is rotatably mounted upon a stud projecting from the frame 60 and is provided with a screw threaded hub extension 61 which may be engaged by the correspondingly threaded sleeve of the crank 28. By this means the gear 59 can be rotated and its motion is imparted to a pinion 62 secured to the end of the shaft 63 which supports the supply reel 31, there being a slot and pin connection between the shaft 63 and the reel 31 to insure the rotation of the reel 31 with the shaft 63. By turning the handle 28 the supply reel 31 can be caused to rotate in a proper direction to rewind the film, the film being supported at the point indicated by the reference character 64 in Fig. 1 by the finger or any other suitable means to prevent it from dragging over the adjacent parts of the projecting mechanism.

During the projecting operations it is necessary that the taking shutter 65 be held in an inoperative position, as shown in dotted outline in Fig. 4 and in full lines in Fig. 1. The shutter 65 as described in my prior application, is secured to the end of an arm 66, the opposite end of which is mounted to oscillate about a pin 67 secured to the frame plate 10, the shutter oscillating between the cover plate 27 and the frame plate. In order to hold the arm 66 in its elevated position I provide a lug 67 which is struck up from the frame plate 10 and projects outwardly beyond the plane of the arm 66. This lug lies above the position to which the arm 66 is actuated when my camera is used for taking pictures and does not, therefore, interfere with the operation of the shutter 65. When, however, I desire to use my camera for projecting purposes I raise the arm 66 and at the same time spring it outwardly beyond the end of the lug 67 until it passes over the end of this lug. When the arm is then released it springs inwardly toward the frame plate 10 and is prevented from dropping downwardly by the lug 67.

While I have described the details of the preferred embodiments of my invention it is to be understood that they are not limited to these details, but include any other adaptations or modifications thereof within the scope of the appended claims.

This application is a division of my copending application Serial No. 219,797, filed March 1, 1918.

Having thus described my invention, what I claim as new and desire to secure by Letters Patent of the United States is:

1. A motion picture machine comprising a drive shaft, a film spool frictionally mounted on said drive shaft, a take-up magazine rotatably mounted on drive shaft, a supply magazine secured to said take-up magazine, the said magazines having removable end caps and peripheral film slots, a film chute, a roller lying above the upper end of said film chute and the slot in said supply magazine, and means for advancing the film over said roller and through said film chute, the said means being driven by said drive shaft.

2. A motion picture machine comprising a drive shaft, a film spool frictionally mounted on said drive shaft, a take-up magazine rotatably mounted on said drive shaft, a supply magazine secured to said take-up magazine, the said magazines having peripheral film slots, a film chute, a roller lying above the upper end of said film chute and the slot in said supply magazine, and means for advancing the film over said roller and through said film chute, the said means being driven by said drive shaft.

3. A motion picture machine comprising a drive shaft, a film spool frictionally mounted on said drive shaft, a take-up magazine rotatably mounted on said drive shaft, a supply magazine secured to said take-up magazine, the said magazines having peripheral film slots, a film chute, a roller lying above the upper end of said film chute and the slot in said supply magazine, and means for advancing the film over said roller and through said film chute.

4. A motion picture machine comprising a drive shaft, a take-up magazine mounted to oscillate on said drive shaft, a supply magazine supported by said take-up magazine, a film chute, a means driven by said drive shaft for feeding film from said supply magazine through said film chute and into said take-up magazine.

5. A motion picture machine comprising a drive shaft, a take-up magazine mounted to oscillate on said drive shaft, a supply magazine supported by said take-up magazine, a film chute, and means for feeding film from said supply magazine through said film chute and into said take-up magazine.

6. A motion picture machine comprising a drive shaft, a take-up magazine mounted to oscillate on said drive shaft, a supply magazine supported by said take-up magazine, a lens support, and means driven by said drive shaft for withdrawing film from said supply magazine past said lens support and feeding it into said take-up magazine.

7. A motion picture machine comprising a drive shaft, a take-up magazine supported on said drive shaft, a supply magazine supported by said take-up magazine, a lens support, and means for withdrawing film from said supply magazine past said lens support and feeding it into said take-up magazine.

8. A motion picture machine comprising a drive shaft, and a supply magazine mounted to oscillate bodily about said drive shaft and means driven by said drive shaft for withdrawing film from said supply magazine.

9. A motion picture machine comprising a drive shaft, and a supply magazine supported by said drive shaft, the center of said supply magazine being eccentric to the axis of said drive shaft and means driven by said drive shaft for withdrawing film from said supply magazine.

In witness whereof, I hereunto subscribe my name this 16th day of April, 1918.

VARIAN M. HARRIS.

Witnesses:
MARY A. COOK,
ALVIN C. AHLBERG.